Figure 1:
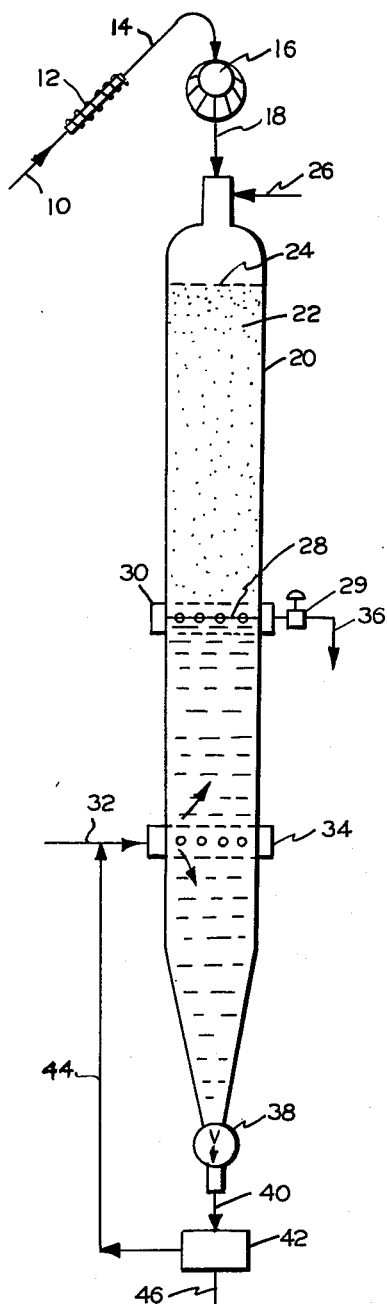

Nov. 2, 1965 T. N. KLEINERT 3,215,588
CONTINUOUS IMPREGNATION, COOKING, AND WASHING
OF FIBROUS MATERIAL
Filed Aug. 15, 1963

INVENTOR
THEODOR N. KLEINERT

BY *Ross L. Foertmeyer*

ATTORNEY 3,215,588
CONTINUOUS IMPREGNATION, COOKING, AND WASHING OF FIBROUS MATERIAL
Theodor N. Kleinert, Pointe Claire, Quebec, Canada, assignor to The Lummus Company, New York, N.Y., a corporation of Delaware
Filed Aug. 15, 1963, Ser. No. 302,379
14 Claims. (Cl. 162—19)

This application is a continuation in part of my copending application Serial No. 33,659, filed June 3, 1960, and now abandoned.

This invention relates to a process for the production of pulp from fibrous plant material, and more particularly is based upon the discovery of a new way of controlling the physical and chemical phenomena which occur during chemical pulping, especially with respect to the solubilizing and removal of certain substances from the plant material to liberate the fibers.

In a preferred embodiment of the present invention fibrous plant material, such as wood chips, is first thoroughly impregnated with cooking liquor under such conditions as to achieve substantially uniform distribution of the cooking chemicals within each chip at a temperature sufficiently low to avoid substantial progress of the delignification reaction during impregnation and transportation of the impregnated material to the cooking zone. The impregnated material is then subjected to pressurized steam to rapidly raise the temperature of the impregnated plant material to a level such as to promote rapid reaction, and under such conditions as to assure that the temperature of each individual chip is brought up to reaction temperature in a very brief period of time.

It is particularly a feature of the present invention that the rapid rise to reaction temperature of properly impregnated fibrous plant material initiates the solubilization simultaneously of those associated substances which bind the fibers together in the plant tissue. Such associated substances are essentially amorphous and are primarily comprised of lignin and hemicellulosic substances and are probably associated in dispersed systems throughout the plant material and particularly in the middle lamella. If a portion of the hemicellulosic substances is removed before the lignin, the remaining lignin may undergo physical changes which adversely affect its solubilization as occurs in conventional processes.

In contrast, the process of the present invention initiates simultaneous solubilization of lignin and hemicellulosic substances. Consequently, by minimizing successive and self-prolonged solubilization of the amorphous substances, cooking times are realized which are substantially shorter than cooking times heretofore regarded as essential.

The much shorter cooking times and the simultaneous solubilization of the amorphous substances made possible by high-temperature vapor-phase cooking provided in the present process, in combination with termination of cooking and substantial extraction of solubilized substances in a liquid phase, without intervening reduction of pressure to atmospheric level, flashing off of steam and exposure to air, make possible the achievement of results not obtainable by existing processes whether batch or continuous.

On the one hand, the rapid rise to high cooking temperature not only affords very short cooking times, but allows the production of pulps of lower lignin content than are obtainable with liquid-phase processes in which, during the slow rise to cooking temperature, the lignin is modified in such a manner that it becomes more difficult to remove. On the other hand, termination of cooking by immersion of the vapor-phase cooked material in a cooling liquid achieves two purposes. First, removal of a substantial portion of the solubilized substances at high temperature minimizes the redeposition of these substances onto the pulp fibers which can occur at lower temperatures in the presence of the cooking chemicals in low concentration at the end of the cook, with resulting decrease in pulp brightness; in addition, removal of solubilized substances prior to the exposure of the pulp to air minimizes atmospheric oxidation of residual dissolved lignin which also contributes to darkening of the pulp.

In summary, therefore, the present process offers the multiple advantages of very short cooking time, low lignin content of the pulp, and high unbleached pulp brightness. In addition, as will become apparent later, the present process makes possible the recovery of spent cooking liquor at high concentration and temperature, with marked benefits in the subsequent chemical recovery process.

The rapid rise in temperature should be as nearly uniform as possible for all of the chips and this result can be achieved by introducing the previously impregnated chips and pressurized steam into a continuous digester under such conditions that the steam has access to the surfaces of all of the chips for rapid heat transfer in a substantially uniform manner. The chips are maintained at the reaction temperature established by the pressurized steam for a brief cooking time of from 5 to 25 minutes. Depending on the type of fibrous plant material being treated, steam cooking may be extended to about one hour.

With continuous digester of full commercial size, the process of the present invention may be readily carried out by the movement at a controlled rate of through-put of wood chips into and through the digester having a zone wherein the chips are rapidly and uniformly heated and cooked in vapor phase by pressurized steam with continuous movement of the chips from such zone into a succeeding zone in which the chips are immersed in a liquid provided for extraction of solubilized amorphous material.

As hereinbefore mentioned, an important aspect of my invention is the termination in a definite and positive manner of steam cooking by immersion of the cooked material into a liquid.

In the liquid zone, the cooked material is continuously passed towards the discharge end of the digester for a period of time from about 5 to a maximum of 30 minutes. In the liquid zone, two effects take place, namely, (1) displacement of the highly concentrated liquor released from the pulp during cooking by shrinkage of the chips, whereby during the short period of time of this displacement there is a relatively little swelling of the pulp, and (2) cooling of the pulp.

The liquid provided for the liquid phase is introduced at a relatively low temperature adjacent to the discharge end of the digester, and is caused to flow countercurrently to the flow of the material to cool the pulp to a temperature of about 100° C. to 120° C. whereby mechanical damage to the pulp is minimized during discharge from the digester. The flow of the relatively cool liquid countercurrently through the pulp results in a progressive rise in temperature of the liquid simultaneously with progressive increase in solids dissolved therein.

As essential aspect of my invention is to regulate the flow of liquid passing in countercurrent contact with the pulp so that the effluent liquid reaches a concentration of from about 15 to about 30 percent with respect to the solubilized substances extracted from the pulp. The liquid is withdrawn from the apparatus below the level which forms the interface between the zone of vapor phase cooking and the zone of liquid extraction.

Liquor displacement occurs near the interface between the vapor phase and liquid phase and is greatly enhanced by the reduced viscosity of the black liquor at the high temperature of the interface. At this high temperature, pulp swelling is substantially smaller than at the lower temperatures of the prolonged continuous washing techniques used in conventional practice. Pulp swelling has a strong bearing upon liquor through-flow, and increases during pulp cooling with time until reaching an equilibrium. Consequently, in accordance with my process, black liquor displacement and cooling of the pulp are effected under favorable conditions as contrasted to known processes utilizing lower washing temperatures whereby considerable swelling of the pulp occurs which impairs liquor through-flow.

The present process may be carried out with any of the cooking chemicals ordinarily used in the production of pulp from plant material, and examples will be provided illustrating results obtained using "kraft," "sulphite" and "neutral-sulphite" cooking liquors.

Fibrous plant material, for example ordinary wood chips as customarily utilized in the production of pulp, is first thoroughly and uniformly impregnated with a suitable cooking liquor at a temperature below that at which the delignification reaction progresses rapidly between the cooking liquor and the constituents of the wood chips. No apparatus for such impregnation is shown in the drawings since different impregnating systems may be employed. However, it is important that impregnation be thorough and as uniform as possible with minimum exposure to temperatures above 100° C. in order to achieve the maximum benefits offered by the present invention. It is preferred that the chips be deaerated by steam treatment before impregnation, and, without intervening exposure to air, be impregnated under relatively high hydrostatic pressure. U.S. Patents 2,640,774 granted June 2, 1953, and 2,749,240 granted June 5, 1956, disclose effective processes for the deaeration and impregnation of chips. One such process may include, if desired, sweeping of the raw chips with steam at atmospheric pressure, thereafter subjecting them briefly to steam at superatmospheric pressure, rapidly releasing the steam pressure to purge air from the interior of the chips and, without intervening exposure to air, impregnating the purged chips with cooking liquor.

Irrespective of the particular manner in which the chips may be impregnated in preparation for the present process, they are separated from the surrounding cooking liquor as by draining away liquor which has not been imbibed by the chips and the separated, impregnated chips are transported in substantially uncooked condition to the apparatus chosen for practice of the present process.

Figure 2:
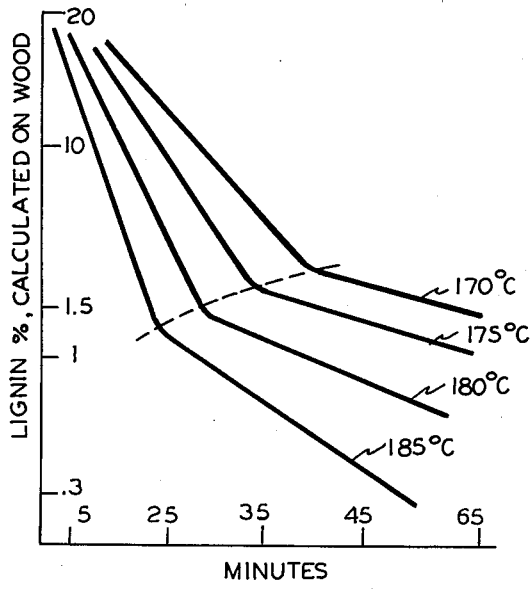
Figure 3:
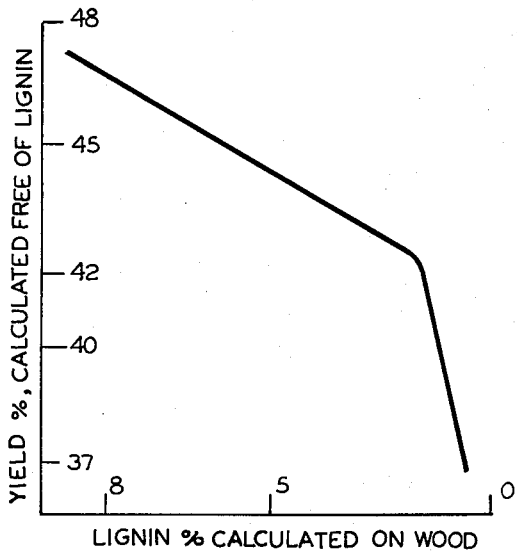

A fuller understanding of the invention may be had by referring to the following description when taken in conjunction with the accompanying drawings, in which FIGURE 1 is a diagrammatic view of an apparatus for effecting the delignification of fibrous plant material, in accordance with the present invention, FIGURE 2 in a graph illustrating the effect of temperature in vapor phase kraft cooking wherein residual lignin is plottted as a function of cooking time at various temperatures, and FIGURE 3 is a graph illustrating the effect of the two delignifcation mechanisms on pulp yield (calculated free of lignin) wherein yield is plotted as a function of lignin content.

Referring to FIG. 1, there is shown an illustrated form of apparatus suited for practice of the present invention. Impregnated chips are intorduced at 10 into a conveyor 12 and passed through line 14 to a rotary or other suitable loading valve 16. The impregnated chips are passed through line 18 into a digester, generally indicated as 20, in which they form a pile 22 extending up to a level of chips, generally indicated as 24. The level of chips 24 is maintained by suitable correlation between the rates of input and output to the digester 20. Steam is continuously introduced into the digester 20 through line 26.

The chips in the upper portion of the pile 22 are thus delignified in an atmosphere of steam, without being immersed in liquor, throughout their downward movement until they reach a liquid level 28 established by a control valve 29 which controls the rate of draw-off of the processing liquid through strainer ring 30. Processing liquid is introduced into the lower end of the digester 20 through line 32 and strainer ring 34. A portion of the processing liquid flows upwardly, thus countercurrently to the flow of chips and pulp, to the liquid level 28, from below which the processing liquid together with solubilized amorphous substances is withdrawn through strainer ring 30 and line 36.

The processing liquid is preferably introduced at a relatively cool temperature, appropriate for continuous withdrawal of the pulp with minimum fiber damage. As a portion of the processing liquid flows upwardly countercurrent to the flow of chips or pulp, the temperature of the processing liquid increases. By further control of the rate of flow of processing liquid with regard to the temperature at which it is introduced, the liquid may be withdrawn at level 28 at any appropriate temperature, preferably at a temperature approximately that of the chips introduced into liquid zone of digester 20. The withdrawal of the processing liquor at such a temperature afford unexpected economy and simplification of recovery of heat which is ordinarily lost when pulp is blown to the atmosphere.

As hereinbefore mentioned, an essential aspect of the invention is to control the flow rate of the such processing liquid passing in countercurrent contact to the delignified chips to provide a processing liquid having a concentration of from about 15 to 30 percent of solubilized amorphous substances from the chips, which liquid is withdrawn through line 36.

The steam-cooked chips pass directly into the processing liquid and consequently the pressure on the processing liquid is the same as the steam pressure maintained in the delignification zone of the digester 20. Processed pulp is continously withdrawn from the lower end of the digester 20 by a rotary valve 38, or by other suitable discharge means and passed through line 40.

The pulp processed in accordance with the present invention may be withdrawn from the lower end of the digester by a screw press, if so desired, instead of the unloading valve or restricted passageway suggested above. Screw-press unloading of pulp at or near the temperature at which it is usually cooked will result in substantial damage to the fiber. In fact, this is true in varying degrees of many other unloading procedures. It has been necessary in many continuous systems to provide for cooling of the pulp by dilution with a cooling liquid prior to unloading and the added cooling liquid places a further burden upon recovery and heat conservation systems. By my process the pulp is progressively cooled by progressively more dilute processing liquid as it approaches the discharge point and it may be discharged at a temperature sufficiently low to withstand severe unloading and liquid separating conditions, as by screw-press unloading, with very little fiber damage. For chemical economy, a major portion of the liquid in which the pulp is discharged may be recirculated directly from the screw-press or other separator, generally indicated as 42, through line 44 to be combined with the processing liquid in line 32. The pulp is thereupon passed through line 46 for further processing.

FIGURE 2 illustrates the effect of temperature in vapor-phase kraft cooking where the logarithm of lignin (calculated on wood) is plotted against cooking time at various temperatures. The logarithm of residual lignin decreases as a straightline function of time until some lignin level is reached, at which time there is a sharp inflexion in the lignin-time relation, followed by a much slower reduction in lignin. Of particular importance, it should be noted that with progressively increasing temperture, the point of inflexion shifts to lower lignin levels. Therefore, the use of rapid rise to high cooking temperatures has the double advantage of permitting very short cooking time and also a high degree of lignin removal. However, there is a practical limit to the temperature used which, for kraft cooking, is about 190° C. Above such temperature, cooking time becomes so short that control of the process becomes very difficult and also carbohydrate degradation is accelerated to a point where pulp yield and strength is reduced.

FIGURE 3 is a graph wherein yield (calculated free of lignin) percent is plotted against lignin percent at a delignification temperature of 180° C. The graph illustrates the effect of the two delignification mechanisms on pulp yield (calculated free of lignin) and provides an indication of pulp yield after bleaching. The graph shows that yield loss in the range of bulk delignification is far smaller than yield loss in the range of residual delignification. Thus, in residual delignification substantial amounts of hemicelluloses and celluloses are lost, whereas in accordance with my invention, by rapidly heating the chemically impregnated chips to high cooking temperature, bulk delignification can be achieved at high rates to low values of residual pulp lignin with minimal carbohydrate losses.

It will be appreciated that apparatus just described is particularly well adapted for commercial practice of the present invention on a continuous basis. When the impregnated chips, which preferably have been maintained at a temperature substantially below a value at which the delignification reaction proceeds at a rapid rate, first enter the digester 20 they are rapidly and uniformly heated to an equilibrium temperature with the pressurized steam. For example chips impregnated and maintained at temperatures less than about 150° C. are brought into contact with pressurized steam at a temperature above 175° C. and preferably between about 180° C to 190° C.

The chips are passed through the steam cooking zone at such a rate as to provide a substantially uniform retention time for each chip which is very brief when compared with conventional liquid-phase processes. For example, the retention time may vary from about twenty minutes down to ten minutes or less.

The temperature of withdrawal of the processing liquid from the strainer ring 30 is also chosen for maximum heat economy in a particular installation. In either case the temperature of the processing liquid can rise to a point approaching the temperature of the steam-cooked chips as they enter the upper surface of the processing liquid. For a given temperature of processing liquid introduced at the strainer ring 34 (FIG. 1), the temperature of the liquid withdrawn from strainer ring 30 will be higher at reduced flow rates. Also, at reduced flow rates, the concentration of dissolved substances will be higher in the withdrawn liquid. Within practicable limits, therefore, it is advantageous to operate with a volumetric flow of countercurrent processing liquid which will favor the withdrawal of liquid at high temperature and concentrations of solubilized amorphous substances in the aqueous processing liquid of from about 15 to about 30 percent. Nevertheless, the volumetric flow must not be so low in any particular installation as to result in failure to accomplish the desired degree of extraction of soluble constituents.

As hereinbefore mentioned, the processing liquid is relatively cool at the time of introduction into the digester at the lower strainer ring 34. As a practical matter, the liquid preferably should be at a temperature such that it is relatively free of dissolved air or other gases which might be harmful to the color or other characteristics of the particular pulp being produced. If water is used with a pulp which would be seriously degraded by air dissolved therein, it is preferable to introduce the water at a temperature of at least about 90° C.

The retention time of the steam-cooked chips within the liquid phase is determined by the rate of flow of the chips and the dimensions of the apparatus in which the liquid phase operation is carried out, and is controlled so that the period of time the chips pass through the liquid phase is not greater than about 30 minutes. For a given installation the length, or both length and cross-sectional dimensions, of the liquid phase zone may be chosen with regard to the dimensions of the steam-cooking zone to provide the desired ratio between rentention times in the two zones.

For example the apparatus may be so proportioned as to provide the same retention time in both phases and in that event, the chips which have been steam-cooked for about ten minutes may be retained in the liquid phase for about ten minutes. Excellent pulps have been produced from chips impregnated with kraft cooking liquor, steam-cooked for about ten minutes at 185° C. and extracted in a processing liquid comprising water or mildly alkaline aqueous solutions for about ten minutes with the temperature of the processing liquid ranging from about 100° C. up to almost 185° C. at the point of withdrawal. The pulps resulting from such operations and others in which retention times in the vapor phase were increased to about 15 minutes or at most to about 20 minutes have given an unusually high yield of light coloured, easily bleachable, fully cooked pulps of papermaking grade and of unusually high strength.

The upper and lower limits of the temperature ranges for impregnation of the plant material, for steam-cooking and for extraction or liquid-cooking and extraction, are primarily practical in nature and the selection of specific temperature within such ranges for a particular embodiment may be made to establish in practical balance of economy in time, chemical consumption, heat recovery and desired characteristics of the pulp.

Thus, impregnation may be carried out with cooking liquor at temperatures ranging up to about 150° C. The time required for complete penetration is markedly shortened at the higher temperatures and the uniformity of chemical distribution within the plant material is greatly improved. Also, when penetrated at the higher temperatures, the plant material, such as wood chips, may be more rapidly raised to steam-cooking temperature with less condensation of steam and consequent dilution of the imbided cooking liquor. However, when temperatures substantially greater than about 150° C. are used a marked "cooking" occurs which proceeds at a relatively slow rate, but nevertheless may advance sufficiently to partially defeat the important advantages afforded by the simultaneous solubilization of the associated substances which bind the fibers together in the plant tissue. As a practical matter penetration is quite slow, and is likely to be non-uniform in chemical distribution at room temperatures even with application of highly hydrostatic pressure. In experimental investigation it was found that the temperature range for penetration and introduction of the impregnated chips to the steam-cooking zone is preferably from about 75° C. to about 150° C. Prolonged maintenance of the chips at temperatures above 100° C. should be avoided during penetration and transportation to the steam-cooking phase.

The steam-cooking temperature is preferably somewhat higher than the temperatures at which wood chips ordinarily are cooked in liquid phase in cooking liquors of the various familiar types. For example a kraft cook in liquid phase is ordinarily carried out for several hours at temperatures from about 170° C. up to about 180° C. The process of the presentt invention offers the advantage of cooking at temperatures from 180° C. to about 190° C. whereby the steam-cooking may be completed in from twenty minutes to ten minutes or even less. When steam-cooking temperatures above about 190° C. are used in the present process, the apparent rates of the various chemical reactions involved are so rapid that the practical difficulties of control with the attendant risks of non-uniformity of cooking and increased cellulose degradation may outweight the apparent advantages of extremely brief cooking times. For the production of a particular pulp, with all other factors remaining unchanged, the steam-cooking time required for the practice of the present process may be about twenty minutes at 180° C., about fifteen minutes at 185° C., about ten minutes at 188° C. and even shorter at 190° C.

It has already been pointed out that the temperature of the processing liquid may range, preferably from warm enough to be relatively free from air, up to level somewhat below the temperature of steam-cooking. The time required for extraction of the solubilized constituents of the steam-cooked chips is greatly reduced at higher temperatures and higher liquid pressures but should not be greater than about 30 minutes.

It will be apparent that the temperature ranges discussed above are all compatible with one another and that a wide range of pulping operations may be carried out in simple apparatus preferably of a continuous type and with particular facility in apparatus of the illustrative type described herein.

Illustrative examples of pulping processes embodying the present invention will now be set forth.

*Example 1.—Sulphite pulping*

Spruce chips of normal commercial size were deaerated and impregnated under hydrostatic pressure of about 150 p.s.i.g. with a sulphite cooking liquor at about 100° C. under conditions, as described above, to achieve substantially uniform distribution of chemicals throughout the chips. The cooking liquor contained 44 g.p.l. total sulphur dioxide and showed a pH of about 2.0. The chips were separated from the surrounding liquor and while still hot were exposed to pressurized steam at 185° C. under conditions, as described above, for rapid and uniform heating of the chips and they were retained in the steam at substantially 185° for ten minutes and then were submerged in processing liquid at about 150° C. The processing liquid consisted of an aqueous solution of sulphur dioxide showing a pH of about 1.5 The steam-cooked chips were retained in the liquid phase for twenty minutes for further cooking and extraction and emerged from the pressure vessel at a temperature below 150° C. After washing with warm water a white pulp of 57.7% yield (calculated on the initial wood) was obtained. This pulp exhibited properties as follows:

| | |
|---|---|
| Roe No. | 10.8 |
| Lignin (percent) | 8.6 |
| Initial CSF freeness | 681 |
| Initial tear factor | 104 |
| Initial breaking length (M) | 8,990 |
| Beating to 300 CSF (min.) | 30 |
| Tear factor | 73 |
| Burst factor | 80 |
| Breaking length (M) | 12,400 |
| MIT folding | 1,240 |

*Example 2.—Neutral sulphite pulping*

Spruce chips of normal commercial size were deaerated and pressure impregnated as described above in Example 1. The impregnating liquor was a 12% sodium sulphite solution in water (pH 8.6). After separation of the impregnated chips from the surrounding liquor they were heated rapidly as described above, by pressurized steam at about 185° C. and were cooked in the pressurized steam for twenty-five minutes after which they were immersed in processing liquid the maximum temperature of which was about 150° C. The processing liquid was a 2% sulphur dioxide solution in water and the chips were retained in the liquid phase for thirty minutes. The resultant pulp was white and after washing in warm water showed a yield of 56.0% with the following properties:

| | |
|---|---|
| Roe No. | 10.6 |
| Lignin (percent) | 8.5 |
| Initial CSF freeness | 668 |
| Initial breaking length (M) | 8,870 |
| Initial tear factor | 75 |
| Beating to 300 CSF (min.) | 21 |
| Tear factor | 56 |
| Burst factor | 65 |
| Breaking length (M) | 11,900 |
| MIT folding | 830 |

The following general comments apply to the utilization of the process of the present invention in connection with so-called "acid" or "neutral" cooking liquors. Examples 1 and 2 are illustrative of but two of the variants of such cooking liquors which may be used with unexpected success in the present process. For example if plain water is used as the processing liquid, pulps of higher yield may be obtained although with somewhat greater residual lignin. The short cooking times and the unusually high steam-cooking temperature would not appear to be possible or feasible on the basis of the prior art teachings in this field. However, the constituents of such cooking liquors adsorb on the lignin in the chips, and if penetration is carried out under favorable conditions of temperature, deaeration and hydrostatic pressure, within the principles of the present invention, the concentration of such constituents will be higher in the chips than in the liquor surrounding the chips. When the chips have been separated from the surrounding liquor and are rapidly heated to about 180° C. to 185° C., the chemical reactions will start immediately. If sodium bisulphite is used for example, some gaseous sulphur dioxide will be split off and distributed throughout the steam phase, resulting in a pH increase in the reaction phase and reducing of cellulose degradation. Thus the steam-cooking temperatures of the present process may be safely utilized. If subsequent liquid cooking and extraction is then carried out, as taught herein, for a period of time which is very short when compared with usual commercial cooking, the cellulose will not be substantially attacked even though sulphur dioxide may be redissolved or introduced into the liquid. The pulps resulting from Examples 1 and 2 show low quantities of residual lignin and furthermore the residual lignin has not been substantially condensed because of the short cooking time and the fact that the lignin and certain hemicelluloses have been coincidentally solubilized. Thus the high yield of cellulose is coupled with easy bleachability and good strength.

*Example 3.—Kraft pulping*

A series of kraft cooks was made using spruce chips or a mixture of spruce and jackpine chips as identified in the following table. In each case the chips were deaerated and impregnated with a kraft cooking liquor of 25% sulphidity. After impregnation the chips were separated from the surrounding kraft liquor and the quantity of liquor imbibed by the chips was such, at a liquor to wood ratio of about 2:1, that the total alkali (expressed as NaOH) in the chips was in the range of about 16% to 18% based on oven dry wood. The yields reported below are based on oven dry wood. The processing liquid used for extraction was hot water having at the lowest temperature in the range of 100° C. to 120° C. and at the highest temperature of about 170° C. as noted in the table. The pulps were light-coloured and were easily bleached.

TABLE 1

| Wood Chips | Minutes Steam Cook, 185° C. | Minutes Liquid Extraction, 170° C. | Yield, Percent Unbleached | Yield, Percent Bleached (lignin free) | Unbleached Pulp Beaten to 300 CSF Tear Fact. | Unbleached Pulp Beaten to 300 CSF Break. Length | Unbleached Pulp Beaten to 300 CSF Fold MIT |
|---|---|---|---|---|---|---|---|
| Spruce | 10 | 10 | 55.5 | 49.9 | 77 | 15,000 | 3,000 |
| Spruce | 15 | 10 | 54.0 | 49.1 | 80 | 15,500 | 3,090 |
| Spruce | 15 | 15 | 55.5 | 50.0 | 87 | 15,200 | 2,360 |
| Spruce | 15 | 15 | 54.5 | 49.3 | 86 | 15,000 | 2,040 |
| Mixture: Jackpine Spruce | 15 | 15 | 54.0 | 49.4 | 90 | 15,300 | 2,220 |

In alkaline pulping operations embodying the present invention, of which the series of kraft cooks in Example 3 is merely illustrative, the rapid heating of the impregnated chips and the very short cooking times which are made possible because of the rapidity with which the coincident solubilization of amorphous substances progresses, afford advantage of special value. Certain undesirable side reactions which progressively occur during the lengthy cooking periods in conventional liquid-phase alkaline pulping operations are sharply reduced in extent in the present process. Thus, alkaline degradation of the fibrous cellulose portions and other carbohydrates in the plant material is reduced, preserving to a great extent the natural fiber strength. The formation of dark coloured substances is reduced. In kraft cooking, especially, a most important feature is that the formation of odorous sulphur compounds is very sharply reduced. The reduction in extent of side reactions also reduces the amount of acidic side reaction products and thus the present process affords a substantial saving in the amount of alkali consumed.

While I have shown and described a preferred embodiment of my invention, it is understood that the same is not limited thereto, but is susceptible of many changes and modification within the spirit and scope thereof, and I, therefore, do not wish to be limited to the details shown and described herein, but intend to cover all such changes and modifications as are encompassed by the scope of the appended claims.

I claim:

1. A process for the production of pulp from subdivided plant material such as wood chips, which comprises;
   (a) impregnating said material with delignifying liquor;
   (b) introducing said impregnated material into a delignification zone;
   (c) introducing steam into said delignification zone whereby rapid heating of said impregnated material in said zone to substantially the temperature of said steam is effected;
   (d) passing said impregnated material through said delignification zone for a period of time sufficient to render soluble, in an aqueous liquid, a major portion of the amorphous substance of said material;
   (e) thereafter passing said delignified material to a wash zone;
   (f) introducing an aqueous processing liquid into said zone and passing said processing liquid in counter-current contact to said delignified material to terminate the delignification of said material and to dissolve a portion of the solubilized amorphous substances of said material;
   (g) withdrawing from the upper portion of said wash zone aqueous processing liquid having solubilized amorphous substance dissolved therein, controlling the rate of withdrawal to provide an aqueous processing liquid having a concentration of from about 15 to about 30 percent of said solubilized amorphous substances;
   (h) and withdrawing pulp from the lower portion of said wash zone.

2. A process as defined in claim 1 wherein said aqueous processing liquid is introduced into said wash zone at a temperature of from about 70° C. to about 120° C., and wherein said aqueous processing liquid is withdrawn from said zone at about the same temperature as the pulp introduced into said wash zone.

3. A process as defined in claim 1 wherein said impregnated material is passed through said delignification zone for a period of time of from about 5 to about 25 minutes.

4. A process as defined in claim 1 wherein said delignified material is passed through said wash zone for a period of time not greater than about 30 minutes.

5. A continuous process for the production of pulp from subdivided plant material, such as wood chips, which comprises:
   (a) Impregnating said material with delignifying liquor;
   (b) continuously introducing impregnated material into a delignification zone;
   (c) introducing steam into said delignification zone whereby rapid heating of said impregnated material in said zone to substantially the temperature of said steam is effected;
   (d) continuously passing said impregnated material downwardly through said delignification zone for a period of time sufficient to render soluble, in an aqueous liquid, a major portion of the amorphous substances of said materal;
   (e) thereafter continuously passing said delignified material to a wash zone;
   (f) continuously introducing an aqueous processing liquid into said zone and passing said processing liquid in counter-current contact to said delignified material to terminate the delignification of said material and to dissolve a portion of the solubilized amorphous substances of said material;
   (g) withdrawing from the upper portion of said wash zone aqueous processing liquid having solubilized amorphous substances dissolved therein, controlling the rate of withdrawal to provide an aqueous processing liquid having a concentration of from about 15 to about 30 percent of said solubilized amorphous substances;
   (h) and continuously withdrawing delignified material from the lower portion of said wash zone.

6. A process as defined in claim 5 wherein said impregnated material is passed through said delignification zone for a period of time of from about 5 to about 25 minutes, and wherein said delignified material is passed through said wash zone for a period of time not greater than about 30 minutes.

7. A process as defined in claim 5 wherein said aqueous processing liquid is introduced into said wash zone at a temperature of from about 70° C. to about 120° C. and wherein said aqueous processing liquid is withdrawn from said wash zone at about the same temperature as the pulp introduced into said wash zone.

8. A process for the production of pulp from subdivided plant material, such as wood chips, which comprises:
   (a) impregnating said material with delignifying liquor;
   (b) introducing said impregnated material into a delignification zone;
   (c) introducing steam into said delignification zone and intimately mixing said impregnated material and steam to effect rapid heating of said impregnated material in said zone to substantially the temperature of said steam;
   (d) passing said impregnated material downwardly through said delignification zone for a period of time sufficient to render soluble, in an aqueous liquid, a major portion of the amorphous substances of said material;

(e) thereafter immediately passing said delignified material to a wash zone;

(f) introducing an aqueous processing liquid at an intermediate point into said zone and passing said aqueous processing liquid in counter-current contact to said delignified material to terminate the delignification of said material and to dissolve a portion of said solubilized amorphous substances of said material;

(g) withdrawing from the upper portion of said wash zone aqueous processing liquid having solubilized amorphous substances dissolved therein in a concentration of from about 15 to about 30 percent;

(h) and withdrawing delignified material together with aqueous processing liquid from the lower portion of said wash zone;

(i) separating a substantial portion of said aqueous processing liquid from said delignified materials;

(j) and returning the thus separated aqueous processing liquid to said wash zone.

9. A process for the production of pulp from subdivided plant material, such as wood chips, which comprises:

(a) impregnating said material with delignifying liquor;

(b) introducing said impregnated material into a delignification zone;

(c) introducing steam into said delignification zone whereby heating of said impregnated material in said zone to substantially the temperature of said steam is effected;

(d) passing said impregnated material downwardly through said delignification zone for a period of time sufficient to render soluble, in an aqueous liquid, a major portion of the amorphous substance of said material;

(e) thereafter immediately introducing said delignified material into a wash zone and passing said material downwardly therethrough;

(f) introducing an aqueous processing liquid into said wash zone at an intermediate point thereof;

(g) passing a portion of said liquid in counter-current contact with said delignified material to dissolve a portion of the solubilized amorphous substances of said material;

(h) passing the remaining portion of said liquid downwardly with said delignified material through said wash zone;

(i) withdrawing from the upper portion of said wash zone said first portion of said aqueous liquid having solubilized amorphous substances dissolved therein;

(j) withdrawing from the lower portion of said wash zone the remaining portion of said aqueous liquid together with delignified material;

(k) and controlling the rate at which said aqueous liquid is introduced into said wash zone and the rate at which said first and remaining portions are withdrawn from said zone so that said first portion of aqueous liquid has a concentration of from about 15 to about 30 percent of said solubilized amorphous substances and said remaining portion has a pulp consistency of less than about 10 percent.

10. A process as defined in claim 9 wherein said aqueous processing liquid is introduced into said wash zone at a temperature of from about 70° C. to about 120° C, and wherein said aqueous processing liquid is withdrawn from said wash zone at about the same temperature as the pulp introduced into said wash zone.

11. A process as defined in claim 9 wherein said impregnated material is passed through said delignification zone for a period of time of from about 5 to about 25 minutes, and wherein said delignified material is passed through said wash zone for a period of time not greater than 30 minutes.

12. A continuous process for the production of pulp from subdivided plant material, such as wood chips, which comprises:

(a) impregnating said material with delignifying liquor;

(b) introducing said impregnated material into a delignification zone;

(c) continuously introducing steam into said delignification zone whereby rapid heating of said impregnated material in said zone to substantially the temperature of said steam is effected;

(d) continuously passing said impregnated material downwardly through said delignification zone for a period of time sufficient to render soluble, in an aqueous liquid, a major portion of the amorphous substances of said material;

(e) thereafter immediately introducing said delignified material into a wash zone and passing said material downwardly therethrough;

(f) continuously introducing an aqueous processing liquid into said wash zone at an intermediate point thereof;

(g) passing a portion of said liquid in counter-current contact with said delignified material to dissolve a portion of the solubilized amorphous substances of said material;

(h) passing the remaining portion of said liquid downwardly with said delignified material through said wash zone;

(i) continuously withdrawing from the upper portion of said wash zone said first portion of said aqueous liquid having solubilized amorphous substances dissolved therein;

(j) continuously withdrawing from the lower portion of said wash zone the remaining portion of said aqueous liquid together with delignified material; and (k) controlling the rate at which said aqueous liquid is introduced into said wash zone and the rate at which said first and remaining portions are withdrawn from said zone so that said first portion of aqueous liquid has a concentration of from about 15 to about 30 percent of said solubilized amorphous substances and said remaining portion has a pulp consistency of less than about 10 percent.

13. A process as defined in claim 12 wherein said aqueous processing liquid is introduced into said wash zone at a temperature of from about 70° C. to about 120° C, and wherein said aqueous processing liquid is withdrawn from said wash zone at approximately the same temperature as the pulp introduced into said delignification zone.

14. A process as defined in claim 12 wherein said impregnated material is passed through said delignification zone for a period of time of from about 5 to about 25 minutes, and wherein said delignified material is passed through said wash zone for a period of time not greater than about 30 minutes.

References Cited by the Examiner

UNITED STATES PATENTS

| | | | |
|---|---|---|---|
| 1,505,934 | 8/24 | Olier | 162—236 |
| 2,474,862 | 7/49 | Richter | 162—237 |
| 2,542,801 | 2/51 | De Laroza | 162—236 |
| 2,610,119 | 9/52 | Magnuson | 162—17 |
| 2,697,661 | 12/54 | Hollis | 162—17 |
| 2,709,652 | 5/55 | Plunguian | 162—69 |
| 2,803,540 | 8/57 | Durant | 162—246 |
| 2,920,697 | 1/60 | Langen | 162—237 |

DONALL H. SYLVESTER, *Primary Examiner.*